US010635207B2

(12) United States Patent
Nishida

(10) Patent No.: US 10,635,207 B2
(45) Date of Patent: Apr. 28, 2020

(54) TOUCH PANEL AND TOUCH PANEL SYSTEM

(71) Applicant: NETAPPLI CO., LTD., Kahoku-gun, Ishikawa (JP)

(72) Inventor: Makoto Nishida, Ishikawa (JP)

(73) Assignee: NETAPPLI CO., LTD., Ishikawa (JP)

( * ) Notice: Subject to any disclaimer, the term of this patent is extended or adjusted under 35 U.S.C. 154(b) by 0 days.

(21) Appl. No.: 16/330,991

(22) PCT Filed: Sep. 5, 2017

(86) PCT No.: PCT/JP2017/031892
§ 371 (c)(1),
(2) Date: Mar. 6, 2019

(87) PCT Pub. No.: WO2018/047803
PCT Pub. Date: Mar. 15, 2018

(65) Prior Publication Data
US 2019/0235654 A1 Aug. 1, 2019

(30) Foreign Application Priority Data
Sep. 9, 2016 (JP) ................................. 2016-176656

(51) Int. Cl.
*G06F 3/041* (2006.01)
*G06F 3/042* (2006.01)

(52) U.S. Cl.
CPC .............. *G06F 3/041* (2013.01); *G06F 3/042* (2013.01); *G06F 3/0425* (2013.01)

(58) Field of Classification Search
CPC ....... G06F 3/041; G06F 3/0425; G01Q 30/10; G01Q 30/12; G01Q 30/14; G06K 1/126
See application file for complete search history.

(56) References Cited

U.S. PATENT DOCUMENTS

2013/0106791 A1* 5/2013 Tanaami ............... G06F 3/0425
345/175
2015/0234454 A1* 8/2015 Kurz ....................... H04N 5/33
345/156
2019/0391649 A1* 12/2019 Heubel ................... G06F 3/041

FOREIGN PATENT DOCUMENTS

CN 105992988 A 10/2016
JP 2008123032 A 5/2008
(Continued)

OTHER PUBLICATIONS

International Search Report (ISR) dated Dec. 12, 2017, issued for International application No. PCT/JP2017/031892. (1 page).

*Primary Examiner* — Robert J Michaud
(74) *Attorney, Agent, or Firm* — Law Office of Katsuhiro Arai

(57) ABSTRACT

In an exemplary embodiment, a touch panel 1 includes: a touch panel body 10 formed in a bag shape whose touch face 11 is made of a material that is flexible and transmits visible light and infrared light, while an opposite face 12 to the touch face is made of a material that transmits visible light and infrared light, with a fluid 14 filled in the space between the touch face and the opposite face; and an infrared thermographic camera 20 that captures the opposite face; wherein, by recognizing a position touched by the user on the touch face as a heat source, the infrared thermographic camera captures, through the touch face and the opposite face, the infrared light emitted from the heat source. The above touch panel features a simple device constitution, low manufacturing cost, and resistance to failure.

12 Claims, 12 Drawing Sheets

(56) References Cited

FOREIGN PATENT DOCUMENTS

| | | | |
|---|---|---|---|
| JP | 2010067062 | A | 3/2010 |
| JP | 2010277461 | A | 12/2010 |
| JP | 5306059 | B2 | 10/2013 |
| JP | 5406990 | B2 | 2/2014 |
| JP | 2014134454 | A | 7/2014 |
| KR | 1020170008720 | A | 1/2017 |
| WO | 2015120913 | A1 | 8/2015 |

* cited by examiner

[FIG. 1]
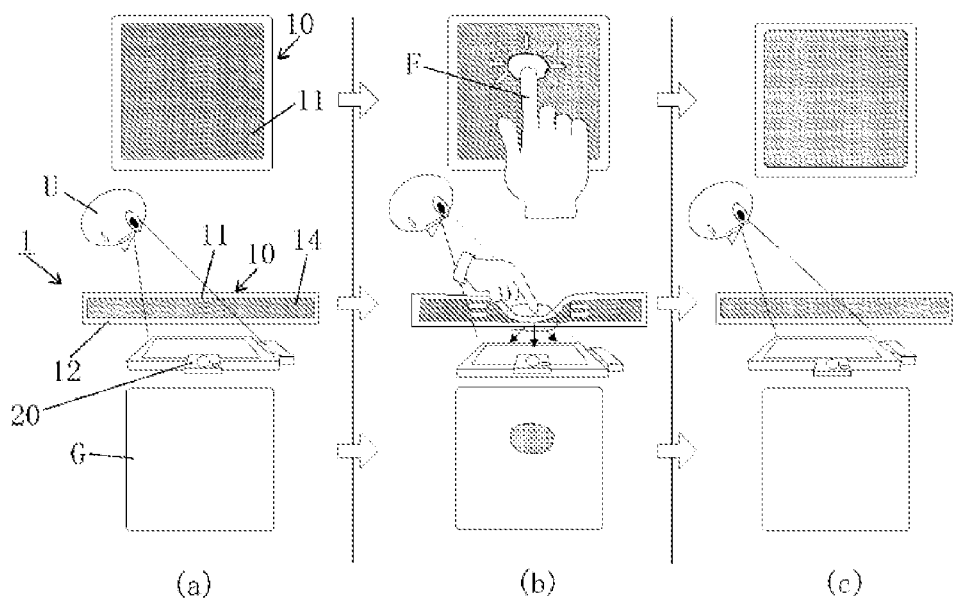
[FIG. 2]
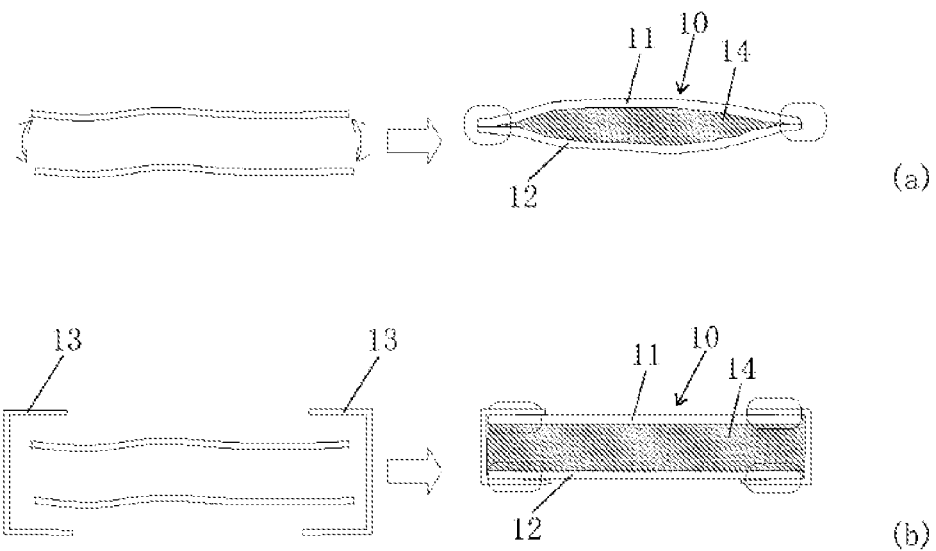

[FIG. 3]
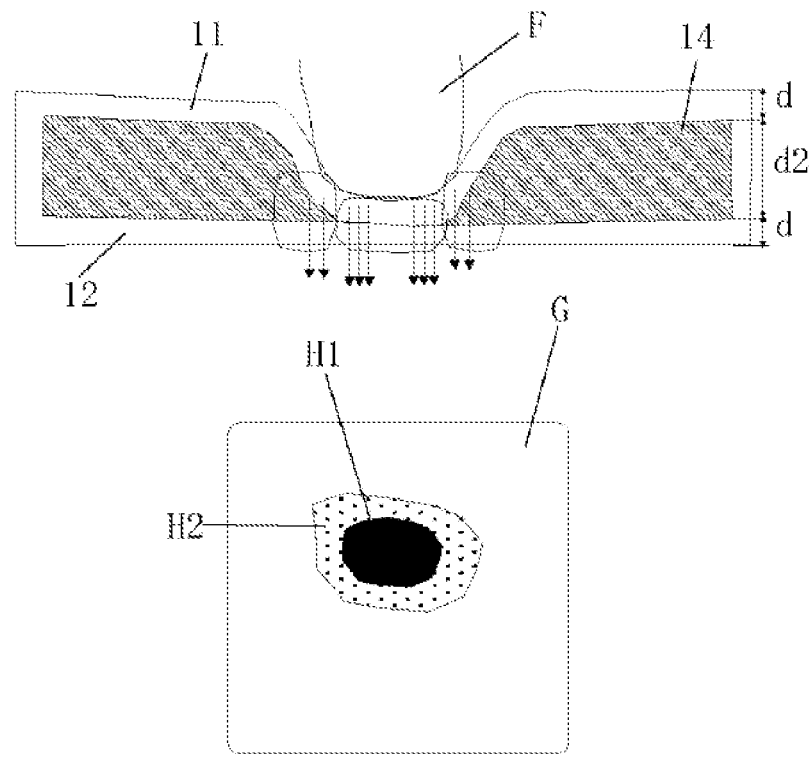
[FIG. 4]
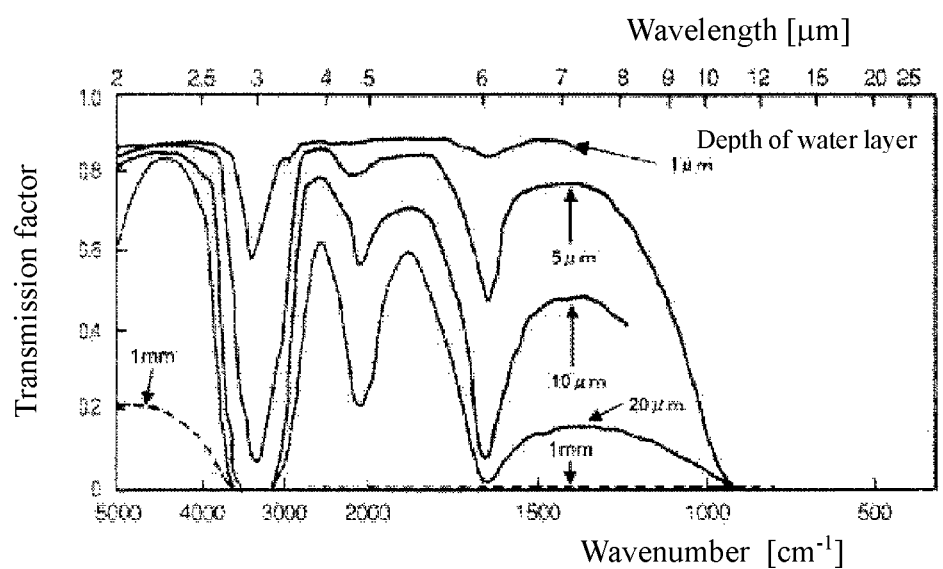

[FIG. 5]
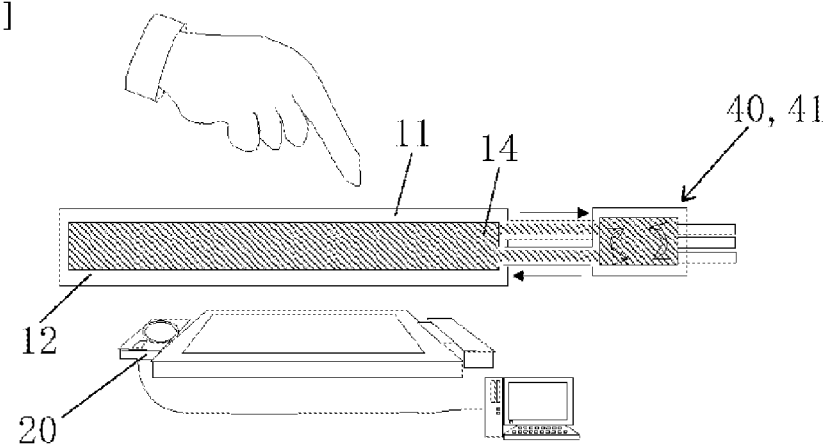
[FIG. 6]
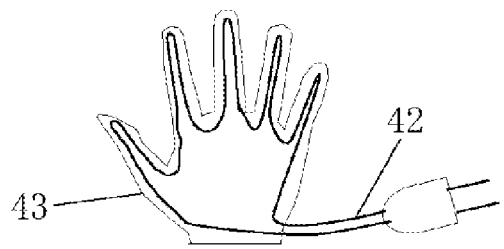
[FIG. 7]
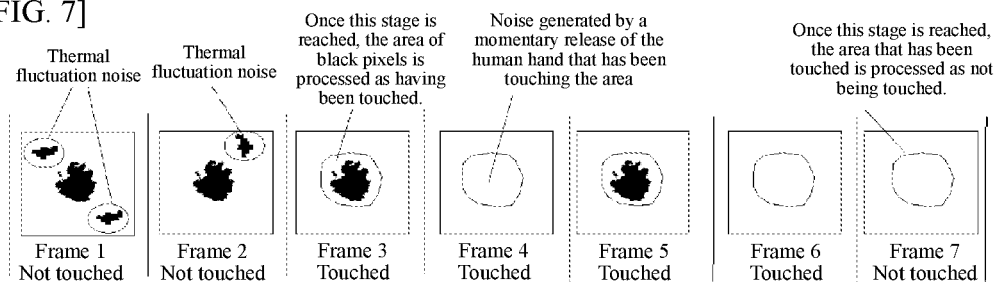

[FIG. 8]
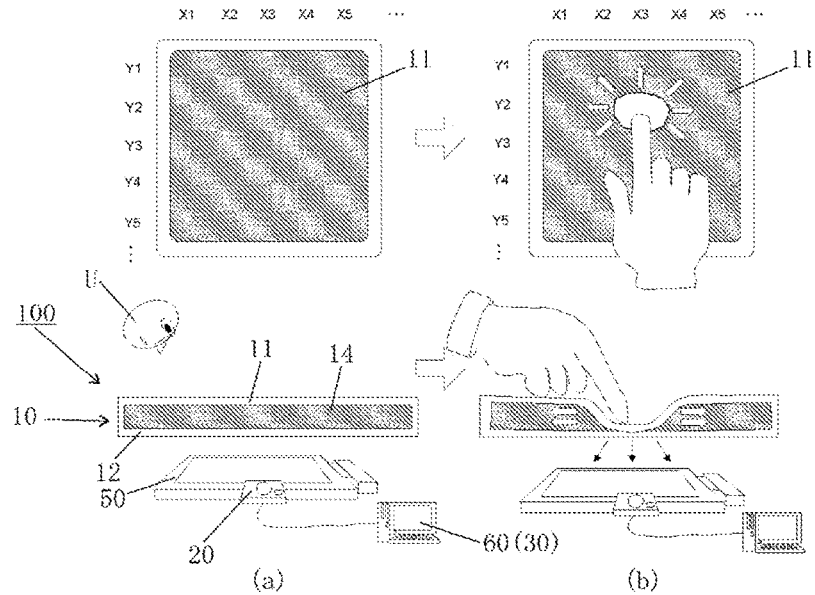
[FIG. 9]
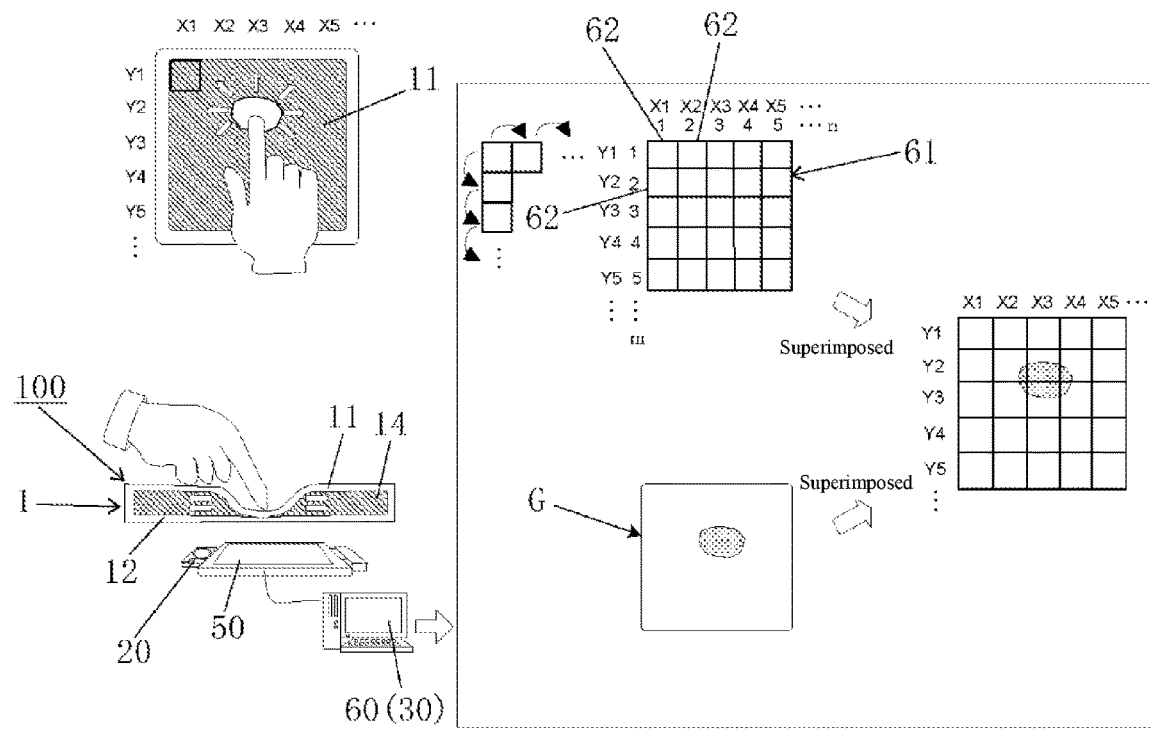

[FIG. 10]
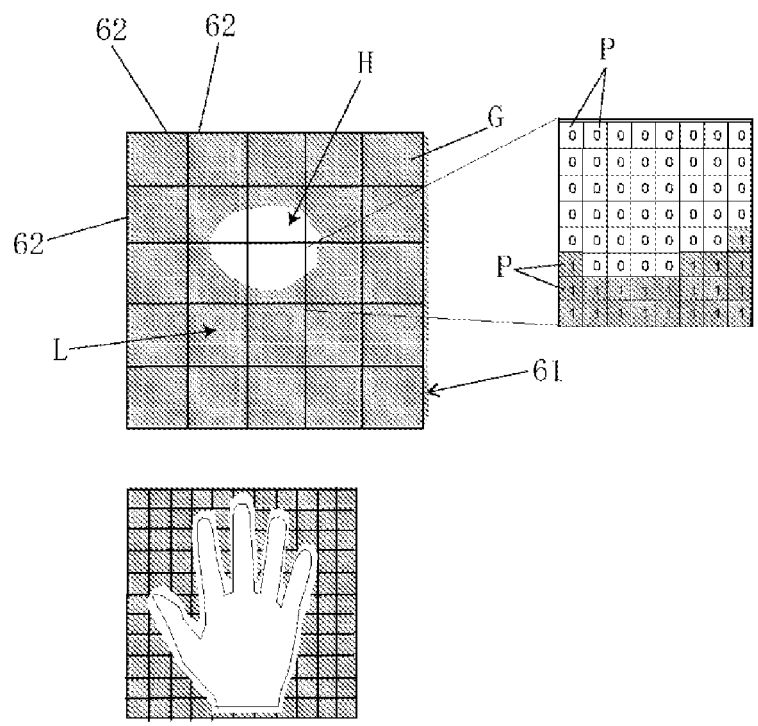
[FIG. 11]
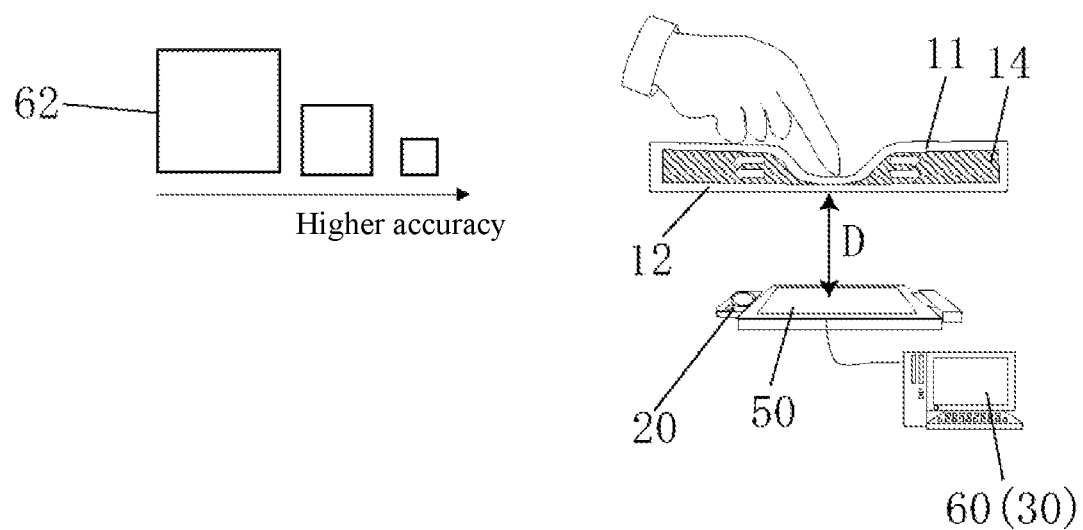
Higher accuracy

[FIG. 12]
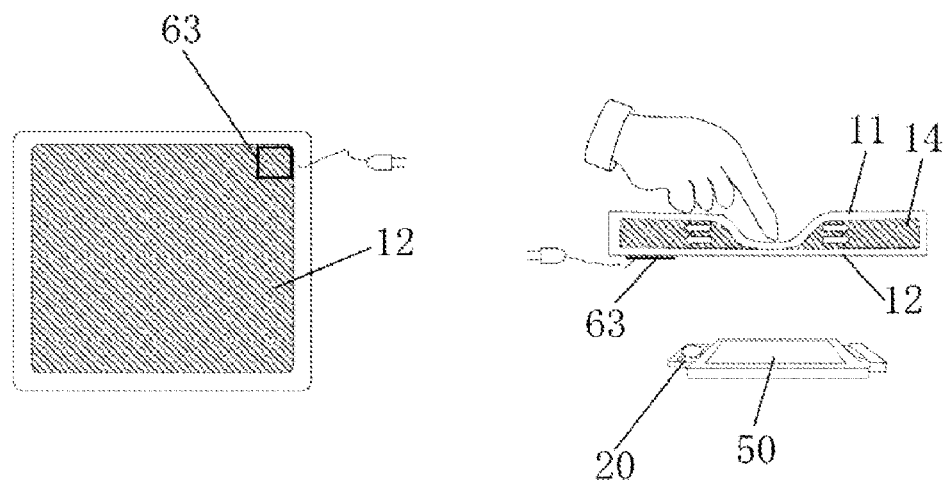
[FIG. 13]
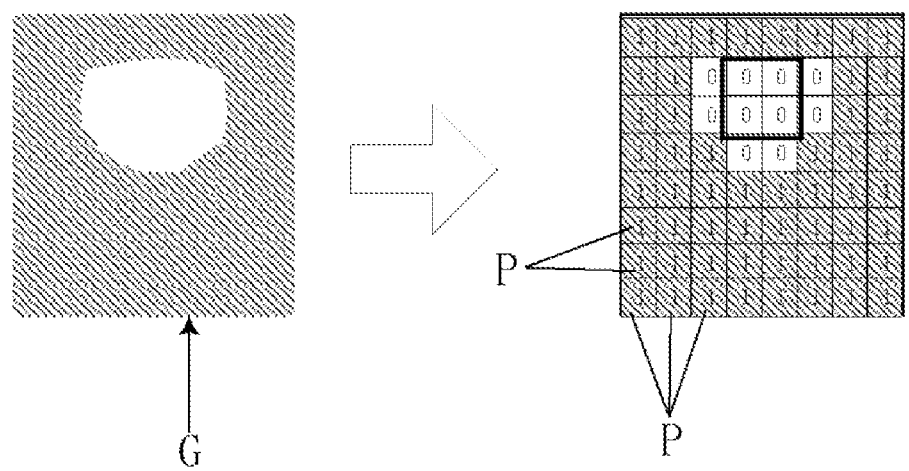

[FIG. 14]
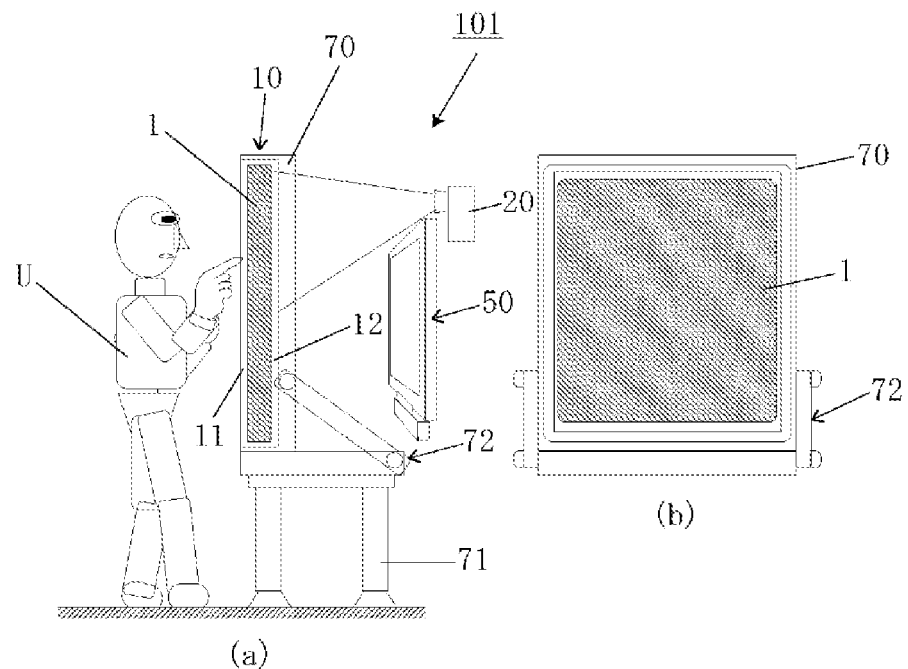
[FIG. 15]
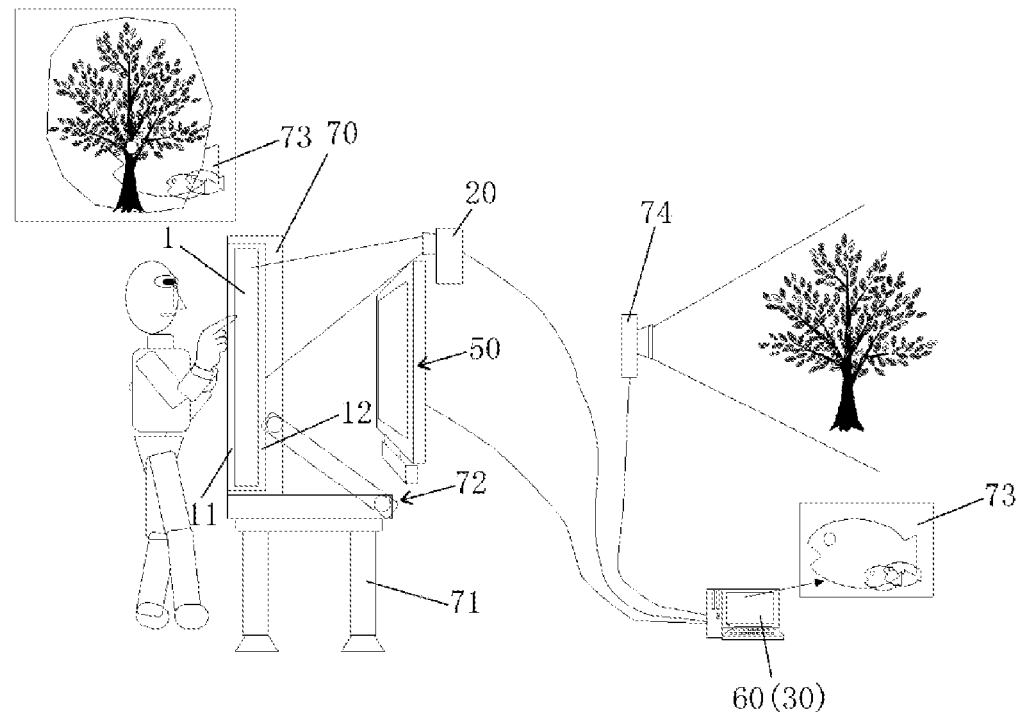

[FIG. 16]
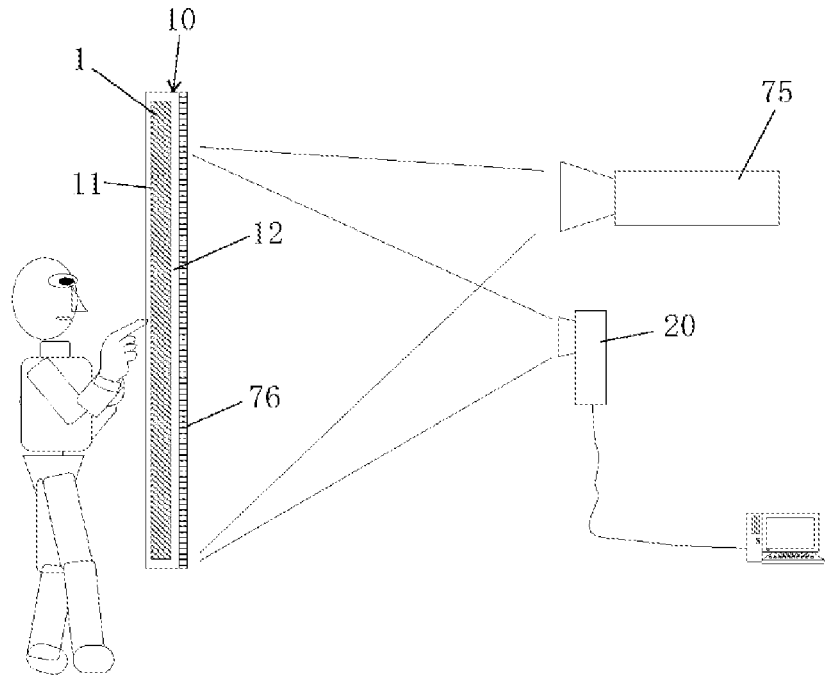
[FIG. 17]
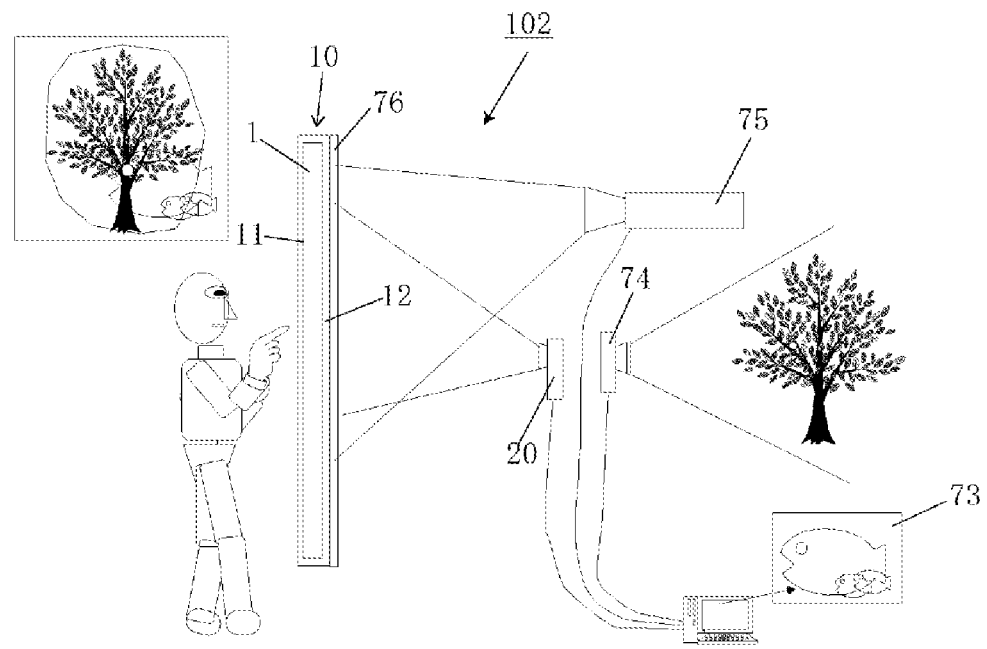

[FIG. 18]
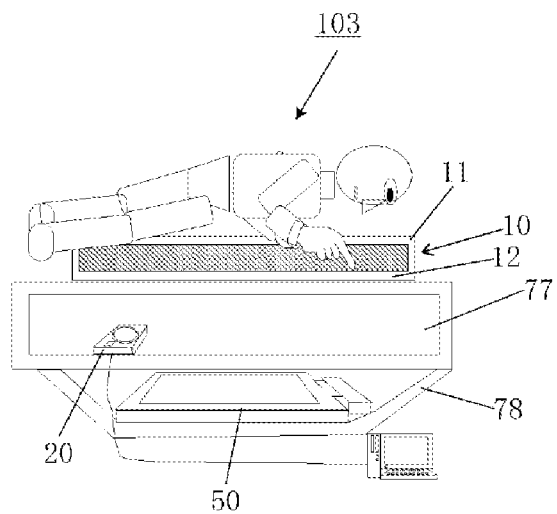
[FIG. 19]
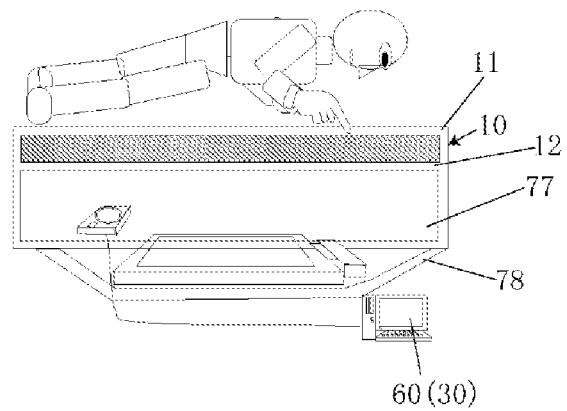

[FIG. 20]
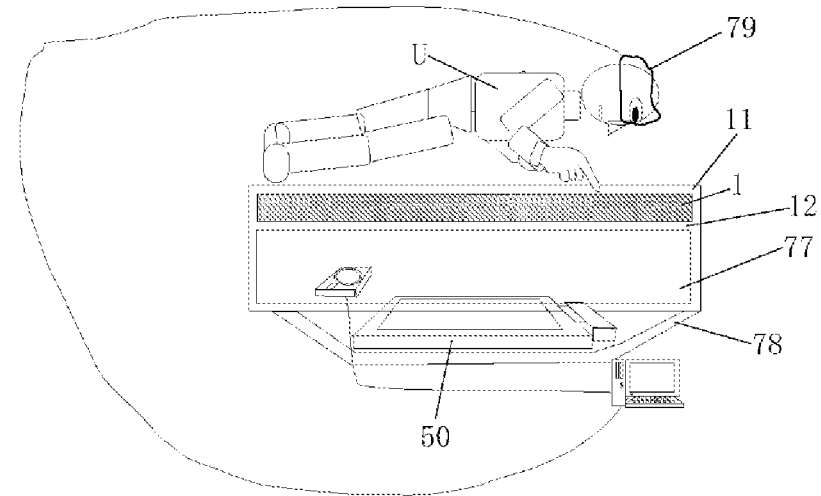
[FIG. 21]
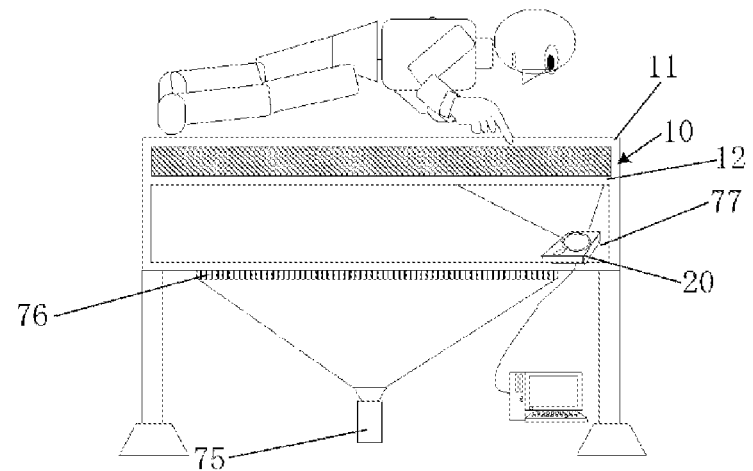

[FIG. 22]
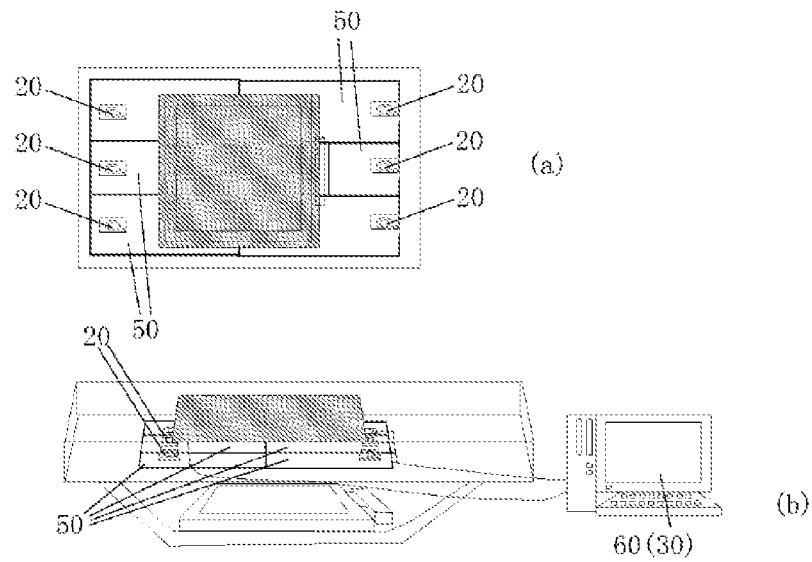
[FIG. 23]
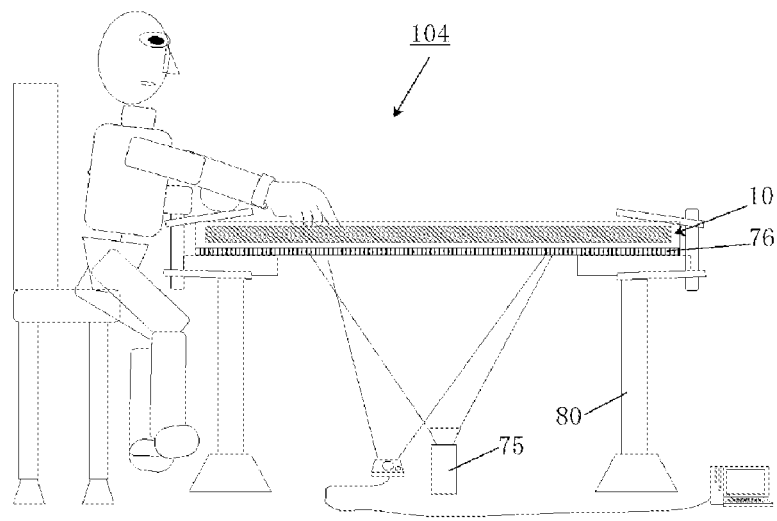
[FIG. 24]
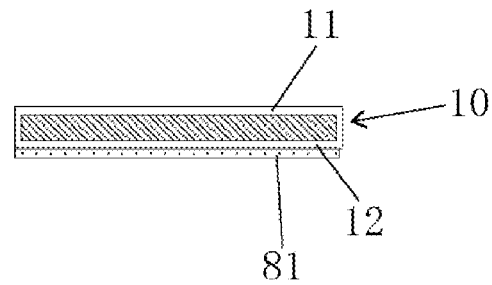

[FIG. 25]
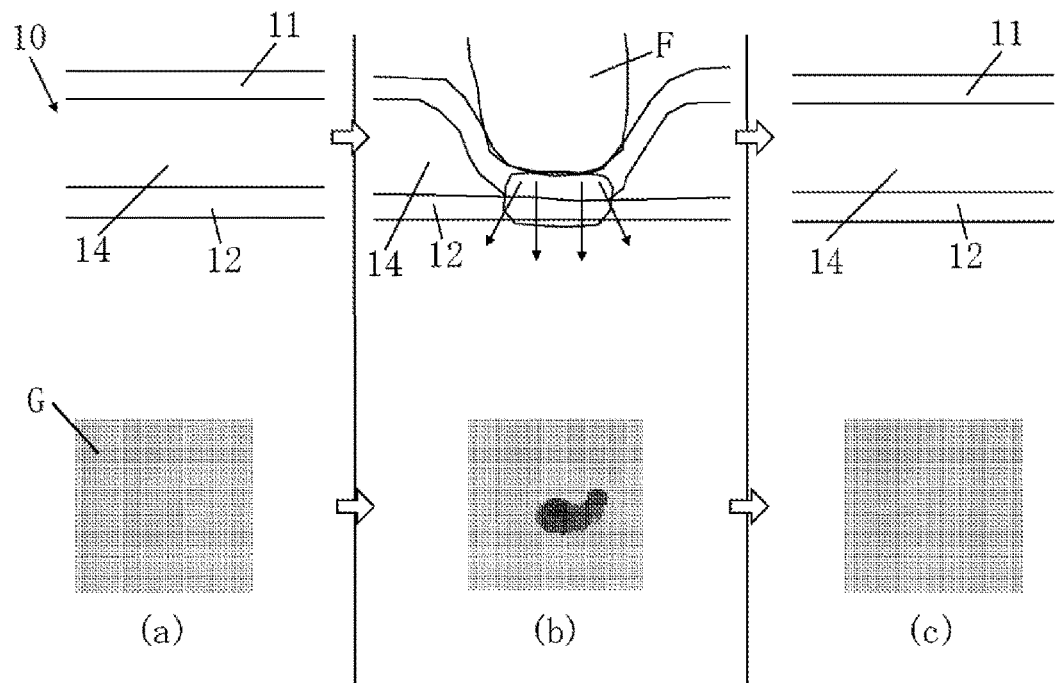
[FIG. 26]
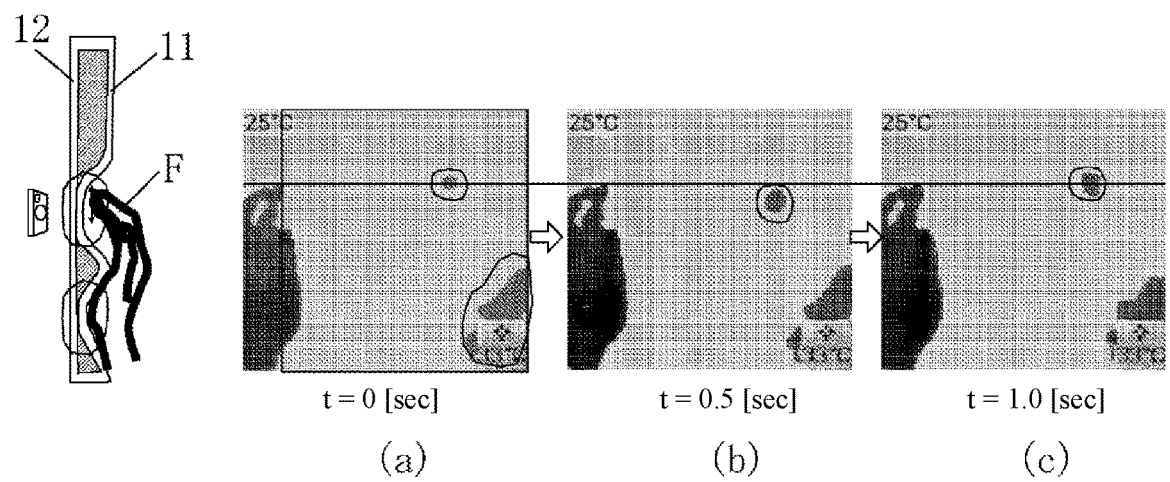

TOUCH PANEL AND TOUCH PANEL SYSTEM

CROSS-REFERENCE TO RELATED APPLICATIONS

This application is the U.S. National Phase under 35 U.S.C. § 371 of International Application PCT/JP2017/031892, filed Sep. 5, 2017, which claims priority to Japanese Patent Application No. 2016-176656, filed Sep. 9, 2016. The International Application was published under PCT Article 21(2) in a language other than English.

TECHNICAL FIELD

The present invention relates to a touch panel, and a touch panel system, featuring a simple device constitution, low manufacturing cost, and resistance to failure.

BACKGROUND ART

Touch panels, each combining an input device and a display device (display), are installed on computers, mobile information terminals, and other electronic information equipment.

Touch panels are available in various types, such as the capacitance type, resistance membrane type, ultrasonic surface elastic wave type, and optical type (infrared optical imaging type).

For example, the capacitance type (refer to Patent Literature 1) adopts a mechanism where electrodes are placed in a matrix pattern inside the panel, and when the user touches the panel with his/her finger, etc., the resulting change in capacitance is used to detect the coordinates.

Also, the resistance membrane type (refer to Patent Literature 2) adopts a mechanism where two membranes are placed in a manner facing each other and constantly receiving voltage from their both edges, and when the user touches the panel, the membranes contact each other and the resulting change in the voltage at this position is used to detect the coordinates.

Further, the optical type (refer to Patent Literature 3) adopts a mechanism where infrared LEDs and image sensors (cameras) are placed at the left and right corners of the top side of the panel, while retroreflective tapes that reflect the incident light in the incident direction are placed on the left side, right side, and bottom side of the panel. When the user touches the panel with his/her finger, etc., and thereby blocks the infrared light, the resulting shadow is captured by the image sensors and the coordinates are detected by triangulation.

BACKGROUND ART LITERATURE

Patent Literature

Patent Literature 1: Japanese Patent No. 5306059
Patent Literature 2: Laid-open No. 2014-134454
Patent Literature 3: Japanese Patent No. 5406990

SUMMARY OF THE INVENTION

Problems to be Solved by the Invention

However, all of the aforementioned prior arts have a complex device constitution and therefore present problems in terms of high manufacturing cost and susceptibility to failure.

In light of the above problems, an object of the present invention is to provide a touch panel featuring a simple device constitution, low manufacturing cost, and resistance to failure, as well as a touch panel system using such touch panel.

Means for Solving the Problems

The touch panel proposed by the present invention is characterized in that it comprises: a touch panel body formed in a bag shape whose touch face is made of a material that is flexible and transmits visible light and infrared light, while the opposite face to the touch face is made of a material that transmits visible light and infrared light, with a fluid filled in the space between the touch face and the opposite face; and an infrared thermographic camera that captures the opposite face; wherein, by recognizing a position touched by the user on the touch face as a heat source, the infrared thermographic camera captures, through the touch face and the opposite face, the infrared light emitted from the heat source.

Also, such touch panel is characterized in that the measurement wavelength of the infrared thermographic camera is 7 [μm] to 14 [μm].

Also, such touch panel is characterized in that it has a heat radiation means or cooling means for lowering the temperature of the fluid.

Also, such touch panel is characterized in that it has a glove with heating means placed at its fingertips, to let the user touch the touch face via the glove.

The touch panel system proposed by the present invention is characterized in that it comprises: a touch panel according to the foregoing; an image display device placed at a position where the user can view images thereon through the touch face and the opposite face; and a touched-position calculation means for calculating, based on an image captured by the infrared thermographic camera, the position on the image corresponding to the position touched by the user on the touch face.

Also, such touch panel system is characterized in that it has a self-supporting mechanism that allows the orientation of the touch panel body to be changed to a horizontal state and a vertical state.

Also, such touch panel system is characterized in that it has a transparent cushion between the touch panel body placed horizontally and the image display device.

Also, such touch panel system is characterized in that the image display device loads and plays videos captured by the camera.

Also, such touch panel system is characterized in that the image display device comprises a projector and a transmission-type projector screen.

Also, such touch panel system is characterized in that the touch panel body is integrated with the transmission-type projector screen.

Also, such touch panel system is characterized in that it has a transmission-type head-mounted display.

Also, such touch panel system is characterized in that it has multiple sets of image display devices and infrared thermographic cameras, each corresponding to the aforementioned image display device and the aforementioned infrared thermographic camera.

Effects of the Invention

The touch panel proposed by the present invention has such effects as simple device constitution, low manufacturing cost and resistance to failure, because it roughly comprises a fluid-filled touch panel body and a commonly-used infrared thermographic camera.

Additionally, a touch panel which is soft to touch, unlike standard touch panels, can be obtained because a fluid is filled inside.

Also, setting the measurement wavelength of the infrared thermographic camera to a range of 7 [μm] to 14 [μm] makes it easy to manufacture the touch panel. This is explained as follows. It is known that increasing the thickness of the space formed between the touch face and the opposite face (distance between the two faces) to at least 1 [mm] virtually prevents transmission of infrared light across this space. This makes it easy to manufacture the touch panel because, by simply ensuring at least 1 [mm] of thickness for this space while making the touch face flexible enough to reduce the thickness of this space to virtually zero or contact the opposite face when pressed, the touch panel can be ensured to have sufficient accuracy in practical use.

Also, by using a heat radiation means or cooling means for lowering the temperature of the fluid, or a glove with heating means placed at its fingertips, a greater temperature difference can be generated between the fluid and the touched position, which can improve the accuracy of detecting the touched position.

The touch panel system proposed by the present invention has such effects as simple device constitution, low manufacturing cost, and resistance to failure, because it roughly comprises the aforementioned touch panel, a commonly-used image display device such as TV or monitor, and a touched position calculation means.

Also, use of an infrared thermographic camera allows for detection of not only the positions touched by the user and shapes of touched areas, but also changes in the user's body temperature (temperature of his/her finger, etc.). This means that the user's psychological state, such as that the user is excited, can be detected from a rise in the temperature of his/her finger, etc., for example.

Also, under a condition where the user's fingertip temperature is constant, changes in the pressure applied by the user as he/she touches the touch face can be calculated based on a distribution of infrared intensities captured by the infrared thermographic camera.

Also, the temperature of the entire fluid filled in the touch panel body is roughly the same as room temperature, so extracting a location where the user touches the touch face and thus infrared light transmits, and a location that does not allow infrared light to transmit, permits immediate binary conversion, and this reduces the processing load on the touched position calculation means.

Also, unlike conventional touch panels using piezoelectric elements, the touch panel proposed by the present invention can load the shapes of areas touched by the user directly as images. This means that, for example, slapping, scratching, and other movements of the user's finger, etc., can be loaded into a computer directly as two-dimensional images. This function can be utilized to make the touch panel usable for gaming and other entertainment apparatuses.

Also, having a self-supporting mechanism that allows the orientation of the touch panel body to be changed to a horizontal state and a vertical state, presents advantages in that the user can operate the touch panel while standing and that the touch panel body can be oriented horizontally for easy transport.

Also, when the touch panel body and image display device are placed horizontally and a transparent cushion is placed in between, the user can operate the touch panel while lying face down.

Also, the image display device can be designed to load and play videos captured by the camera, to realize a simple AR (augmented reality) system.

Also, the size of the touch panel body can be easily increased by constituting the image display device with a projector and a transmission-type projector screen.

Also, the touch panel body and transmission-type projector screen can be integrated and placed horizontally, with the periphery supported by leg parts, for example, so that the user can use the touch panel while sitting in a chair.

Also, by providing a transmission-type head-mounted display, a simple VR (virtual reality) system can be realized.

Also, providing multiple sets of image display devices and infrared thermographic cameras allows the distance from each infrared thermographic camera to the opposite face to be shortened, so the touch panel system can be made smaller.

BRIEF DESCRIPTION OF THE DRAWINGS

FIG. 1 Drawings (a) to (c) showing a touch panel constitution

FIG. 2 Drawings (a), (b) showing a touch panel body structure

FIG. 3 Schematic illustration of an image captured by an infrared thermographic camera FIG. 4 Graph showing the infrared absorption wavelength dependence of water (Source: Koichi Takada, Yoshinobu Egawa, Hisao Sasaki (eds.), *Jitsuyo Ensekigaisen* (*Practical Far Infrared Light*): Human & History Ltd., First Print, Initial Edition, Feb. 27, 1992)

FIG. 5 Drawing showing a touch panel body to which a heat radiation means or cooling means is connected FIG. 6 Drawing showing a heating means FIG. 7 Drawing showing a process of analyzing a captured image FIG. 8 Drawings (a), (b) showing a touch panel system constitution FIG. 9 Drawing showing image data with grid lines FIG. 10 Drawing showing reference markers divided into many pixels FIG. 11 Drawing showing how a reference marker size is adjusted FIG. 12 Drawing showing a correction frame FIG. 13 Drawing showing a captured image directly divided into many pixels FIG. 14 Drawing (a) showing a touch panel body, and an image display device, both standing upright, as well as a front view (b) of a self-supporting mechanism FIG. 15 Drawing showing a touch panel system being used as a simple AR system FIG. 16 Drawing showing a projector combined with a transmission-type projector screen FIG. 17 Drawing showing a touch panel system that combines the constitutions in FIGS. 15 and 16

FIG. 18 Drawing showing a touch panel body, and an image display device, installed horizontally FIG. 19 Drawing showing a touch panel body integrated with a cushion FIG. 20 Drawing showing a transmission-type head-mounted display being worn FIG. 21 Drawing showing a projector combined with a transmission-type projector screen FIG. 22 Drawings (a), (b) showing multiple image display devices, each fitted with an infrared thermographic camera FIG. 23 Drawing showing a touch panel body, and an image display device, installed horizontally FIG. 24 A cross-sectional view showing an adhesive layer provided partially on the touch panel body FIG. 25 Drawings (a) to (c) showing images captured by the infrared thermographic camera as the touch panel body is pressed with a finger FIG. 26 Drawings (a) to (c) showing images captured by the infrared thermographic camera as the touch panel body is brushed with a finger

MODE FOR CARRYING OUT THE INVENTION

First Embodiment of Touch Panel 1

An embodiment of a touch panel 1 according to the present invention is described below using drawings.

As shown in FIGS. 1 (a) to (c), the touch panel 1 roughly comprises a touch panel body 10 and an infrared thermographic camera 20.

The touch panel body 10 is shaped like a bag having a touch face 11 and an opposite face 12. The touch panel body 10 may be fixed in a quadrilateral frame (not illustrated).

The material for the touch face 11 only needs to be flexible and transmit visible light and infrared light. Also, the material for the opposite face 12 only needs to transmit visible light and infrared light. For the touch face 11 and opposite face 12, materials such as soft vinyl chloride, polyethylene, and polypropylene may be used, for example.

For the method for manufacturing the touch panel body 10, two sheets that will constitute the touch face 11 and opposite face 12 are simply fixed together by thermal pressure-bonding, adhesion, or any other known means, along their periphery (locations circled in FIG. 2), in an airtight and watertight manner, as shown in FIG. 2 (a). Or, two sheets that will constitute the touch face 11 and opposite face 12 may be fixed together by edge members 13 covering their surfaces and side edges, as shown in FIG. 2 (b).

A fluid 14 is filled in the space between the touch face 11 and the opposite face 12, or specifically in the touch panel body 10. The fluid 14 may be of any type so long as it is transparent, such as water, gel, etc., but from the following viewpoints, water is suitable. The viewpoints are as follows: water is inexpensive; water has a higher thermal capacity than air, so the entire touch panel body 10 can be maintained at a uniform temperature in a stable manner; cushion property can be added to the touch panel body 10; water has no color and is highly transparent, so visible light can be transmitted over a fairly large thickness to allow the user U to comfortably view images on the image display device 50 which will be described later; and water does not transmit infrared light beyond a certain thickness.

The infrared thermographic camera 20 is provided to capture the opposite face 12. The mechanism is such that the infrared thermographic camera 20 is connected to a computer 30, and images captured by the camera are loaded to and analyzed by the computer 30.

When the user U touches the touch face 11 with his/her finger or the palm of his/her hand, etc. (hereinafter simply referred to as "finger, etc. F"), the touched position becomes a heat source. FIG. 1 (b) shows that, when the user U touches the touch face 11, the interval between the touch face 11 and the opposite face 12 becomes shorter (the thickness of the touch panel body 10 decreases) and the fluid 14 is pushed outward toward the periphery. As described above, the touch face 11 and opposite face 12 transmit infrared light, which means that infrared light transmits more easily at the touched position. On the other hand, a majority of the infrared light emitted from the heat source corresponding to the finger, etc. F is blocked by the fluid 14 other than at the touched position.

As the infrared thermographic camera 20 captures the opposite face 12 and the captured image G is analyzed by the computer 30, the heat source on the touch panel body 10, or specifically the position touched by the user U, can be specified.

FIG. 3 is a schematic illustration of an image G captured by the infrared thermographic camera 20. When the user U presses the touch face 11 with his/her finger, etc. F and the touch face 11 contacts the opposite face 12 as a result, the infrared intensity increases at the contact location where no fluid 14 is present, whereas the infrared intensity becomes relatively lower around the contact location where a small amount of fluid 14 is present. The infrared thermographic camera 20 recognizes the center area of higher infrared intensity as a high-temperature region H1 and its surrounding as a surrounding region H2. Computer analysis may be designed so that the strength with which the touch face 11 is pressed by the finger, etc. F is detected in multiple stages based on temperature distribution, or it may be designed to make binary detection of a touched position corresponding to a range where the temperature has changed and an untouched position corresponding to a range where the temperature has not changed, instead of considering temperature distribution.

As shown in FIG. 1 (c), the interval between the touch face 11 and the opposite face 12 returns to what it was before the moment the user U releases his/her finger, etc. F from the touch face 11, so the infrared thermographic camera 20 can no longer recognize the heat source.

The measurement wavelength of the infrared thermographic camera 20 is not limited in any way so long as the infrared light that has passed through the touch face 11 and opposite face 12 can be captured; however, wavelengths in a range of 7 [μm] to 14 [μm] are particularly preferred. This is partly because infrared thermographic cameras 20 having measurement wavelengths of 7 [μm] to 14 [μm] are readily available in the market, and partly because transmission of infrared light becomes virtually impossible at a water thickness of 1 [mm] or more, as shown in FIG. 4.

Accordingly, infrared light can be virtually blocked when the thickness of the space formed by the touch face 11 and the opposite face 12 (distance between the two faces) is set to 1 [mm] or more. Also, infrared light in the near infrared spectrum, having a measurement wavelength of 2 [μm] or shorter, does transmit over the aforementioned distance between the two faces to some extent, even when it is set to 1 [mm] or more; accordingly, this property may be utilized in the opposite way to create a touch panel body 10 that responds when the distance between the two faces becomes small enough but not zero.

It should be noted that generating a greater temperature difference between the fluid 14 and the finger, etc. F is all that is needed to ensure accurate recognition of touching/not touching of the touch panel body 10 by the finger, etc. F by the infrared thermographic camera 20 (with higher sensitivity).

Accordingly, a heat sink or other known heat radiation means 40, or Peltier element or other known cooling means 41, may be connected to the touch panel body 10 to circulate the fluid 14, as shown in FIG. 5. This way, the temperature of the fluid 14 can be lowered to generate a greater temperature difference from the finger, etc. F.

Also, as shown in FIG. 6, a glove 43 with hot wires or other known heating means 42 placed at its fingertips, etc., may be used to generate a greater temperature difference between the finger, etc. F and the fluid 14.

Also, noise may appear on the captured image due to slight temperature shifts (thermal fluctuations) exhibited by the fluid 14, or the user U may unintentionally lift the finger, etc. F from the touch face 11 for a moment.

Accordingly, the process for analyzing the captured image, as shown in FIG. 7, may be such that, for example, a region of high infrared intensity is recognized as having been touched when the region has been detected continuously for a certain period of time (refer to frames 1 to 3), while a region of high infrared intensity detected only discontinuously is recognized as noise (refer to frames 1, 2). Additionally, if a region of high infrared intensity is detected and subsequently becomes undetected (refer to frame 4), and then it is detected again (refer to frame 5), the user U may be deemed to have been touching there all this time. In this case, a failure to detect a region of high infrared intensity continuously for a certain period of time can be interpreted as the user U having released his/her finger, etc. F from the touch face 11 (refer to frames 6, 7).

First Embodiment of Touch Panel System

The first embodiment of a touch panel system according to the present invention is described below using drawings.

As shown in FIGS. 8 (*a*), (*b*), the touch panel system 100 roughly comprises the aforementioned touch panel body 10, an image display device 50, and a touched position calculation means 60.

The image display device 50 is a device placed at a position where the user U can view images thereon through the touch panel body 10 (touch face 11 and opposite face 12). In other words, the image display device 50 is placed on the opposite side (opposite face 12 side), in between the touch panel body 10, from the user U on the touch face 11 side. In this embodiment, an infrared thermographic camera 20 is fixed to a portion of the frame of the image display device 50.

The touched-position calculation means 60 is provided to calculate, based on an image captured by the infrared thermographic camera 20 (image on the opposite face 12), the position on the image on the image display device 50 corresponding to the position touched by the user U on the touch face 11, or in other words, to calculate where the user U touched on the image. The touched-position calculation means 60 is housed in a computer 30.

As shown in FIG. 9, image data 61 with grid lines is already stored in the storage means of the computer 30. The image data 61 consists of square reference markers 62 arranged in grids in the X and Y directions, and the length and width dimensions are set to agree with the length and width dimensions of the image captured by the infrared thermographic camera 20.

The touched-position calculation means 60 superimposes the image captured by the infrared thermographic camera 20 over the image data 61 with grid lines, to calculate the X and Y coordinates of the touched position. If the square reference markers 62 are 1 cm long and wide, the position touched by the user U on the image may be calculated as 3 cm in the X direction and 2 cm in the Y direction from the origin, for example.

As shown in FIG. 10, one reference marker 62 may have a mixture of regions of relatively high infrared intensity (high temperature regions) H and regions of relatively low infrared intensity (low temperature regions) L. In this case, the inside of the reference marker 62 is divided into many pixels P to detect, for example, that the user U is touching the position on the image corresponding to the reference marker 62 if at least 50% of all pixels P are regions of high infrared intensity. It should be noted that the mechanism may be such that a region of high infrared intensity H is divided into multiple levels corresponding to two or more values (aforementioned high temperature region H1 and surrounding region H2, etc.) to also detect how strong or weak the touch is.

Also, the mechanism may be such that image data 61 is automatically generated when the touch panel system 100 actuates. In this case, the length and width dimensions of the square reference markers 62 can be adjusted according to the distance D between the opposite face 12 and the infrared thermographic camera 20, as shown in FIG. 11. Also, since the accuracy of detecting the touched position can be increased by decreasing the length and width dimensions of the square reference markers 62, their length and width dimensions may also be adjusted according to the purpose of use.

Furthermore, as shown in FIG. 12, a correction frame 63 consisting of a hot wire, etc., may be provided to occupy a portion of the opposite face 12. In this case, the mechanism is such that, when the touch panel system 100 actuates, the infrared thermographic camera 20 recognizes the correction frame 63 of high temperature, and image data 61 with grid lines will be generated after the length and width dimensions of the square reference markers 62 are adjusted identical to the length and width dimensions of this correction frame 63.

Also, the mechanism may be such that, as shown in FIG. 13, the captured image G is directly divided into many pixels P and touching/not touching is detected according to the infrared intensity of each pixel P, instead of using the reference markers 62 or image data 61 with grid lines.

Second Embodiment of Touch Panel System

Next, the second embodiment of a touch panel system 101 according to the present invention is explained, where locations that are constitutionally identical to the aforementioned first embodiment are denoted by the same symbols and not explained.

As shown in FIGS. 14 (*a*), (*b*), the touch panel system 101 in this embodiment is characterized in that its touch panel body 10 and image display device 50 are installed upright.

To be specific, the touch panel body 10 is fixed in a square frame 70. The mechanism is such that the frame is placed on a pedestal 71 such as desk, etc., and a self-supporting mechanism 72 permits orientation change to a horizontal state and a vertical state.

The touch panel system 101 in this embodiment has an advantage in that it can be used by the user U while standing.

Also, as shown in FIG. 15, a simple AR system can be realized by synthesizing the characters 73 generated on a computer 30 and videos captured by a camera 74 connected to the computer 30 and then projecting the results onto the image display device 50.

Also, as shown in FIG. 16, a projector 75 may be combined with a transmission-type projector screen 76 for use as the image display device 50. In this case, the size of the touch panel body 10 can be easily increased.

Furthermore, as shown in FIG. 17, the touch panel system 102 may be one that combines the constitutions in FIGS. 15 and 16.

Third Embodiment of Touch Panel System

Next, the third embodiment of a touch panel system according to the present invention is explained, where locations that are constitutionally identical to the aforementioned first and second embodiments are denoted by the same symbols and not explained.

As shown in FIG. 18, the touch panel system 103 in this embodiment is characterized in that its touch panel body 10 and image display device 50 are installed horizontally.

A cushion 77 made of a transparent material is placed between the touch panel body 10 and the image display device 50. The image display device 50 is fixed to the cushion 77 with a fixing belt 78, and an infrared thermographic camera 20 is fixed inside the cushion 77. In plan view, the shape of the cushion 77 is not limited to rectangular and may be circular or polygonal, or it may be curved, spherical or oval in side view.

The touch panel system 103 in this embodiment has an advantage in that it can be used by the user U while lying face down.

Also, as shown in FIG. 19, the touch panel body 10 may be integrated with the cushion 77.

Also, as shown in FIG. 20, the user U may wear a transmission-type head-mounted display 79 that also provides a forward view. In this case, a VR system can be realized by using the transmission-type head-mounted display 79 to play some images that the user U wants to see close, while using the image display device 50 to play other images the user U wants to see at a distance.

Also, as shown in FIG. 21, a projector 75 may be combined with a transmission-type projector screen 76 for use as the image display device 50. In this case, the size of the touch panel body 10 can be easily increased. Also, by placing the infrared thermographic camera 20 inside the cushion 77, the infrared light on the opposite face 12 can be recognized reliably, even if the transmission-type projector screen 76 is made of a material, or has a shape, that prevents infrared light from transmitting through.

Under the constitution where the touch panel body 10 and image display device 50 are installed horizontally and the cushion 77 is placed in between, as shown in FIGS. 18 to 20, sufficient distance may not be ensured from the infrared thermographic camera 20 to the opposite face 12. In this case, a wide lens can be used for the infrared thermographic camera 20. Or, as shown in FIGS. 22 (a), (b), an infrared thermographic camera 20 may be fitted on each of multiple image display devices 50 so that the touched position calculation means 60 calculates the touched position based on the image captured by each infrared thermographic camera 20.

Fourth Embodiment of Touch Panel System

Next, the fourth embodiment of a touch panel system according to the present invention is explained, where locations that are constitutionally identical to each of the aforementioned embodiments are denoted by the same symbols and not explained.

As shown in FIG. 23, the touch panel system 104 in this embodiment is characterized in that its touch panel body 10 and image display device 50 are installed horizontally. A projector 75 is combined with a transmission-type projector screen 76 for use as the image display device 50.

The touch panel body 10 is integrated with the transmission-type projector screen 76, with the four corners supported by leg parts 80.

The touch panel system 104 in this embodiment has an advantage in that it can be used by the user U while sitting in a chair.

As shown in FIG. 24, an adhesive layer 81 may be provided on the touch face 11 or opposite face 12 of the touch panel body 10, either over its entirety or in a portion thereof, to attach the touch panel body 10 in a desired location for use.

Example 1

FIGS. 25 (a) to (c) show images captured by the infrared thermographic camera 20 as the touch panel body 10 is pressed with a finger.

Polyethylene sheets were used for the touch face 11 and opposite face 12, while water was used for the fluid 14 inside. The water temperature, room temperature and temperatures of the touch face 11 and opposite face 12 were 26 [° C.], the body temperature of the user U was 36.1 [° C.], the thickness d of the touch face 11 and opposite face 12 was d=0.1 [mm], the interval between the touch face 11 and the opposite face 12 when not pressed with the finger was 10 [mm], and the operating frequency wavelength of the infrared thermographic camera 20 was 7.2 [μm] to 13 [μm] in the far infrared spectrum.

In FIG. 25 (a) where the touch face 11 is not pressed with the finger, the infrared thermographic camera 20 does not show anything.

In FIG. 25 (b) where the touch face 11 is pressed with the finger, the infrared thermographic camera 20 is recognizing the infrared light from the finger because the interval between the touch face 11 and the opposite face 12 is virtually zero.

In FIG. 25 (c) where the finger has been released from the touch face 11, again the camera does not show anything.

It should be noted that, while thermographic images normally indicate temperature distributions with colors, the thermographic images in FIG. 25 have been converted to black and white images for greater visual clarity. Actual infrared thermographic cameras 20 can display fine temperature distributions in different colors, not only in black and white, to the extent permitted by their temperature resolution (so-called noise equivalent temperature difference, or NETD). Accordingly, fine changes in the temperature of the finger, etc. F may be recognized and the RGB values of each pixel constituting the thermographic image may be analyzed, to detect data indicating the level of excitement of the user U, together with data relating to the touched position.

Example 2

FIGS. 26 (a) to (c) show images captured by the infrared thermographic camera 20 as the touch panel body 10 is brushed with a finger while the finger, and palm of the hand, are pressed against the touch panel body 10.

Polyethylene sheets were used for the touch face 11 and opposite face 12, while water was used for the fluid 14 inside. The water temperature, room temperature and temperatures of the touch face 11 and opposite face 12 were 25 [° C.], the body temperature of the user U was 36.1 [° C.], the thickness d of the touch face 11 and opposite face 12 was d=0.1 [mm], the interval between the touch face 11 and the opposite face 12 when not pressed with the finger was d2=10 [mm], and the operating frequency wavelength of the infrared thermographic camera 20 was 7.2 [μm] to 13 [μm] in the far infrared spectrum.

It should be noted that, in FIGS. 26 (a) to (c), the left hand that did not touch the touch panel body 10 is also shown in the captured images for the comparison purpose. In other words, these images of the left hand were captured directly by the infrared thermographic camera 20, not via the touch panel 1.

At the start of operation, or t=0 [sec], a region of high infrared intensity appears on the reference line in the top right of FIG. 26 (a), due to the pressing of the right middle finger against the touch panel 1. It should be noted that the reference line was provided for the sole purpose of explaining the movement of the finger.

Next, at t=0.5 [sec], a region of high infrared intensity appears below the reference line in the top right of FIG. 26 (b), due to the right middle finger.

Next, at t=1.0 [sec], a region of high infrared intensity appears above the reference line in the top right of FIG. 26 (c), due to the right middle finger. This is the result of the user U moving his/her right middle finger up and down, as if brushing.

In addition, all of FIGS. 26 (a) to (c) show a region of high infrared intensity in the bottom right due to the palm of the right hand, and this region measures 33 [° C.] based on thermography. As explained above, the systems according to the present invention can detect and record the positions touched by the user U on the touch panel 1, shapes of touched areas, and body temperature of the user U.

INDUSTRIAL FIELD OF APPLICATION

The present invention relates to a touch panel featuring a simple device constitution, low manufacturing cost, and resistance to failure, as well as a touch panel system using such touch panel, and can be used for industrial applications.

DESCRIPTION OF THE SYMBOLS

F Finger, etc.
G Captured image
H High temperature region
H1 High temperature region
H2 Surrounding region
L Low temperature region
P Pixel
U User
1 Touch panel
10 Touch panel body
11 Touch face
12 Opposite face
13 Edge member
14 Fluid
20 Infrared thermographic camera
30 Computer
40 Heat radiation means
41 Cooling means
42 Heating means
43 Glove
50 Image display device
60 Touched-position calculation means
61 Image data
62 Reference marker
62 Correction frame
70 Frame
71 Pedestal
72 Self-supporting mechanism
73 Character
74 Camera
75 Projector
76 Transmission-type projector screen
77 Cushion
78 Fixing belt
79 Transmission-type head-mounted display
80 Leg part
81 Adhesive layer
100 Touch panel system
101 Touch panel system
102 Touch panel system
103 Touch panel system
104 Touch panel system

What is claimed is:

1. A touch panel characterized by comprising:
   a touch panel body formed in a bag shape whose touch face is made of a material that is flexible and transmits visible light and infrared light, while an opposite face to the touch face is made of a material that transmits visible light and infrared light, with a fluid filled in a space between the touch face and the opposite face; and
   an infrared thermographic camera that captures the opposite face;
   wherein, by recognizing a position touched by a user on the touch face as a heat source, the infrared thermographic camera captures, through the touch face and the opposite face, an infrared light emitted from the heat source.

2. The touch panel according to claim 1, characterized in that a measurement wavelength of the infrared thermographic camera is 7 μm to 14 μm.

3. The touch panel according to claim 1, characterized by having a heat radiation means or cooling means for lowering a temperature of the fluid.

4. The touch panel according to claim 1, characterized by having a glove with heating means placed at its fingertips, to let the user touch the touch face via the glove.

5. A touch panel system characterized by comprising:
   the touch panel according to claim 1;
   an image display device placed at a position where a user can view images thereon through the touch face and the opposite face; and
   a touched-position calculation means for calculating, based on an image captured by the infrared thermographic camera, a position on an image corresponding to the position touched by the user on the touch face.

6. The touch panel system according to claim 5, characterized by having a self-supporting mechanism that allows an orientation of the touch panel body to be changed to a horizontal state and a vertical state.

7. The touch panel system according to claim 5, characterized by having a transparent cushion between the touch panel body placed horizontally and the image display device.

8. The touch panel system according to claim 5, characterized in that the image display device loads and plays videos captured by the camera.

9. The touch panel system according to claim 5, characterized in that the image display device comprises a projector and a transmission-type projector screen.

10. The touch panel system according to claim 9, characterized in that the touch panel body is integrated with the transmission-type projector screen.

11. The touch panel system according to claim 5, characterized by having a transmission-type head-mounted display.

12. The touch panel system according to claim 5, characterized by having multiple sets of the image display devices and infrared thermographic cameras.

* * * * *